US009013515B2

(12) United States Patent
Joseph et al.

(10) Patent No.: US 9,013,515 B2
(45) Date of Patent: Apr. 21, 2015

(54) EMISSIVE DISPLAY BLENDED WITH DIFFUSE REFLECTION

(75) Inventors: Daniel M. Joseph, Los Angeles, CA (US); Mark A. Reichow, Valencia, CA (US); David A. Shirley, Clermont, FL (US); James D. Moore, Kissimmee, FL (US); Everett Kevin Thomas, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 504 days.

(21) Appl. No.: 12/958,892

(22) Filed: Dec. 2, 2010

(65) Prior Publication Data
US 2012/0139956 A1     Jun. 7, 2012

(51) Int. Cl.
| G09G 5/10 | (2006.01) |
| G02F 1/1335 | (2006.01) |
| G09F 13/04 | (2006.01) |
| G09F 9/30 | (2006.01) |
| G09F 13/08 | (2006.01) |
| G09F 19/22 | (2006.01) |
| H04N 5/72 | (2006.01) |
| H04N 21/414 | (2011.01) |
| H04N 21/81 | (2011.01) |

(52) U.S. Cl.
CPC *G09F 9/30* (2013.01); *G09F 13/08* (2013.01); *G09F 19/22* (2013.01); *H04N 5/72* (2013.01); *H04N 21/41415* (2013.01); *H04N 21/812* (2013.01)

(58) Field of Classification Search
CPC .............. G09G 2320/066; H04N 5/72; H04N 21/41415; H04N 21/812; G09F 9/30; G09F 13/08; G09F 19/22
USPC ............ 345/82, 77, 102, 690; 349/69, 70, 64, 349/112–115; 362/97.1, 97.2
See application file for complete search history.

(56) References Cited

U.S. PATENT DOCUMENTS

2007/0211184 A1*   9/2007   Erchak et al. ..................... 349/1
2009/0013576 A1*   1/2009   Jake et al. ........................ 40/725
(Continued)

FOREIGN PATENT DOCUMENTS

| DE | 202007000182 | 3/2007 |
| WO | 2008012727 | 1/2008 |

OTHER PUBLICATIONS

Extended European Search Report mailed on Sep. 24, 2012 for EP Patent Application No. 11185923.7-1228/2461318.

*Primary Examiner* — Lun-Yi Lao
*Assistant Examiner* — Ibrahim Khan
(74) *Attorney, Agent, or Firm* — Marsh Fischmann & Breyfogle LLP; Kent A. Lembke (57) ABSTRACT

An apparatus providing a viewer with a blend of displayed and reflected content. The apparatus includes an emissive display device with a display screen operable providing digital content. The emissive display device includes a light source selectively articulating and transmitting light through the display screen at a particular illumination level to display digital content such as text and graphics. The apparatus includes a thematic overlay positioned over the display screen with a front surface configured to provide diffuse reflection of light striking the front surface from a viewer space such that the front surface appears substantially opaque to the viewer and the viewer cannot see the display screen when the light source is inactive or at low brightness. When the light source is in active mode, the displayed content is visible as emissive display content concurrently with the diffuse reflection content but the display screen remains hidden from view.

17 Claims, 9 Drawing Sheets

(56) References Cited

U.S. PATENT DOCUMENTS

2009/0273660 A1* 11/2009 Regen et al. ............... 348/14.02
2010/0014319 A1* 1/2010 Oversluizen et al. ......... 362/627
2010/0201716 A1* 8/2010 Tanizoe et al. ................ 345/690
2011/0273485 A1 11/2011 Coup et al.

* cited by examiner

EMISSIVE DISPLAY BLENDED WITH DIFFUSE REFLECTION

BACKGROUND

1. Field of the Description

One of the reasons these display devices have become ubiquitous is the ease of changing content and/or messaging on the display quickly and effortlessly, which may equate to reduced costs, efficiencies in providing new and changing content, and up-to-date information. Further, the costs of LCDs and other display devices have continued to decrease over time while the size of such displays can range from very small screens to many square feet so that these devices are desirable and useful in many business models.

2. Relevant Background

In many settings, information and images are continuously being presented to viewers or people passing by a location. For example, shopping malls and airport terminals are filled with displays providing information and advertisements. Many of these displays are built up around conventional television monitors and displays such as liquid crystal display (LCD) and plasma display devices. These displays have become a standard tool for advertisement, reprogrammable signage, information stations, and menu boards.

One of the reasons these display devices have become ubiquitous is the ease of changing content and/or messaging on the display quickly and effortlessly, which may equate to reduced costs, efficiencies in providing new and changing content, and up-to-date information. Further, the costs of LCDs and other display devices has continued to decrease over time while the size of such displays can range from very smalls screens to many square feet so that these devices are desirable and useful in many business models.

However, in many settings, the use of conventional displays such as an LCD is undesirable. For example, theme parks and other settings such as restaurants often would prefer not to use an LCD or similar device due to the conventional TV-based aesthetics. These settings may have taken considerable effort to provide a thematic decorative scene and simply placing an LCD or similar display would spoil the desired effect. For example, a television simply looks out of place in a colonial village or in a wizard's store front. Similarly, it would not be theme-appropriate to use an LCD as a menu board in a "wild west" restaurant or a renaissance fair booth.

Lightbox-type displays are an alternative to emissive displays such as LCDs that provide eye-catching graphics using slides or films that are backlit. The slides or films filter and diffuse the backlight as well as diffusively reflect ambient light. Typical backlighting is provided by white light produced by incandescent, fluorescent, LED or similar light source. Lightboxes are eye-catching in that they provide high definition graphics (e.g., higher definition than is practical in an LCD monitor) and rich illuminated colors. However, conventional lightboxes are static (in the case of single-slide models) or slow changing (in the case of multi-slide models) making them impractical for dynamically changing information displays.

Hence, there remains a need for displaying content that can readily be changed and updated, such as menu boards, advertisements, information signage, and the like, in a manner that is more theme-based and not simply in the form of a television monitor, a computer display screen, or other electronic display device. Further, there is a need for display devices and methods for displaying information that provide the rich, eye-catching graphic appeal of a lightbox type display but at the same time provide the ability to present dynamically changing information.

SUMMARY

The present description addresses the above problems by providing a display system that is adapted to blend digital content displayed on a monitor or other emissive display screen with content provided by diffuse light transmission and reflection. This may be achieved in part by providing an emissive display device such as a liquid crystal display (LCD), light emitting diode (LED) displays, organic light emitting diode (OLED) displays, a digital micromirror device (DMD), a cathode ray tube (CRT) and other available emissive display technology in combination with a thematic overlay such as a light diffusing display element or light balancing component in the for in of a slide or diffusive film or the like. The diffusive film may diffuse transmitted light, reflected light or both and may provide an image pattern. In one embodiment, the thematic overlay has a front surface that appears to a viewer to be opaque as it reflects light so that a viewer sees its surface and any "content" thereon (such as a printed graphic or text or just its patterns, colors, and so on). When the emissive display device is operated in an active or "lit" mode, its displayed content is transmitted through the thematic overlay such that the viewer concurrently sees a blend of this emissive display content and the imagery or other effect provided by the thematic overlay. In the display system, the illumination levels of the emissive display device (e.g., LCD or the like) are chosen to suit the illumination levels of a viewer-side light source(s) such that the brightness of the emissive display blends with that of the reflected display.

More particularly, an apparatus is provided for displaying content to a viewer in a viewer space. The apparatus or display system includes an emissive display device with a display screen operable to provide digital content. The emissive display device further includes a light source for selectively articulating and transmitting light (e.g., an LCD or plasma display device providing 400 to 1000 nit or more) through the display screen such that the digital content is visible as displayed content on a surface of the display screen at a particular illumination level. The apparatus further includes a thematic overlay or light balancing overlay positioned over the display screen. in some embodiments, the thematic overlay includes a second (e.g., a rear) surface facing the display screen and a first (e.g., a front) surface, opposite the second surface, that is configured to provide diffusion to the pixels of the emissive display from the viewer's space and/or reflection of light striking the first surface (through another layer of static content imagery) from the viewer space such that the front surface appears substantially opaque to the viewer.

In some cases, the light source is first operated in an inactive mode (or non-display mode), and, in such an inactive mode, the display screen is wholly or partially blocked from view by the viewer by the thematic overlay. The light source may then be second operated in an active mode (or display mode) to transmit the light through the display screen. In this active mode, the displayed content is transmitted through the thematic overlay as emissive display content. The light leaving the front surface is visible by the viewer as diffuse reflection and transmission content concurrently with the emissive display content. In some embodiments, the light source is adjustable to set the illumination level at a level such that the emissive display content has a brightness at least about equal to a brightness of the diffuse reflection and transmission content. In some cases, the brightness of the light source of the display device is adjusted to a level such that a brightness of the emissive display content is about 90 to 110 percent of the brightness of the diffuse reflection such that a viewer cannot readily distinguish the source of the displayed content. In some embodiments, the diffuse reflection content includes a graphical component with a pattern, and the missive display content includes a graphical component aligned with and repeating the pattern (e.g., repeating the grain of wood in wood veneer, repeating a color and graphical image in a printed poster, providing physical texture, and the like). In the apparatus, the thematic overlay may include at least one of a panel of wood veneer, a printed fabric, or a film with printed graphics on the front surface.

BRIEF DESCRIPTION OF THE DRAWINGS

FIG. 4 illustrates a flow diagram of a method of creating a digital content file for use as input to an emissive display device such as an LCD, a plasma display, or the like.

DETAILED DESCRIPTION OF THE PREFERRED EMBODIMENTS

The following description is directed toward display systems that are adapted to blend content emitted from or Shown on a monitor or display screen with content, graphic imagery and patterns reflected or transmitted from a front or exposed surface of a thematic overlay. The content that is reflected and/or transmitted from the thematic overlay may simply be texture of the display element's surfaces (such as from a thin sheet of wood paneling or veneer) or may include images, patterns, text, and the like such as on a sheet of wall paper, a poster, a layer of fabric, prints on clear substrates, physical texture molded into/onto a surface, and the like.

The thematic overlay is "camouflaging" in that it hides or disguises the presence of the monitor or display screen both when it is in an "off" or inactive mode and also when it is operated ("on") or in an active mode in which images, gaphics, text, or other digital content is displayed, which results in a set of emissive display content passing through the diffusing display element. The thematic overlay, in addition to being camouflaging may be thought of as a screen or element that balances both light transmitted and reflected through the material, and, hence, it may be considered a thematic light balancing overlay or thematic light negotiating overlay (with it acting to hide or camouflage the working components to blend into a thematic environment). Note, the overlay does not need to be a material screen but may simply include paint or the like chosen to have a desired amount of transmission as well as reflection. The content provided by the thematic overlay blends with emissive display content to provide a single combined image to a viewer in which all images and information appears to be reflected (i.e., no projection is sensed or identified by the viewer) To this end, the illumination level of the monitor or display screen is adjusted or tuned to assist in this blending of the two contents, e.g., by dialing down or shuttering a light source for the monitor/display screen to keep its illumination level at least at or below that of a viewer-side light source (or at the level of the diffuse reflection content in some cases).

The inventors understood that simply placing an LCD or similar emissive display in a themed viewer space (such as found in a theme park and many other settings) detracts from the viewer's experience. For example, providing a modern product to display information in an old west setting, in a pirate ship, in a medieval castle, and so on quickly spoils the time period theming for a visitor. Prior to the display systems described herein, designers and operators of themed environments either had to avoid use of digital content or had to live with the look and feel of a rectangular television or monitor hanging in their otherwise carefully and beautifully crafted environments (or has to conform to static signage and menu boards with content and messages that were only updateable by hand). The display systems also address the need or desire to provide displays and interesting effects in small and/or short spaces in which projectors with large throws are ineffective. The display systems are rugged and likely have much longer lives than many existing projection technologies such as expensive short-throw lenses and projection lamps that may last less than 2000 hours. Further, the display systems are useful in daylight and other higher ambient light settings and in changing light level applications (e.g., respond to changing light levels on the viewer side by increasing or decreasing the power of the back light source or the like) for a variety of purposes such as presenting information and advertising content in a compelling and theme/environment-appropriate manner, both indoors and outdoors.

As will become clear from. this description and from their experiments with ultrahigh brightness LCDs (e.g., up to 1500 nits or more), the inventors have discovered numerous ways to camouflage display devices such as LCDs so that they may be utilized in nearly any environment without being visible to a viewer. The display systems implement some guiding lighting principles and specific. materials for the thematic overlay (which is positioned between the LCD or other display device and the viewer) that have varying reflective and transmissive qualities (e.g., a partially reflective glass pane, a cloth/fabric sheet, a thin wood or paper layer, or the like). The guiding lighting principles include striking a delicate balance of lighting of the front surface of the diffusing layer or element (e.g., the content provided by the thematic overlay layer/surface as termed in FIG. 1) and of lighting of the rear surface of the diffusing layer or element with the displayed content (e.g., with the display/monitor screen of the emissive display device such as an LCD, a plasma display, a television or computer monitor, or the like with a higher brightness such as 1000 to 1500 nit or more).

The thematic overlay makes use of the concept that all materials, when struck by light, to various degrees or amounts: reflect a percentage of light; absorb a percentage of light; and transmit a percentage of the received light. When light strikes the surface of an object or material (such as the front or content-bearing layer/surface of the thematic overlay), a viewer's eyes perceive the resulting light from that surface of the object and the brain articulates its color, textures, luminance, and so on. The display systems described herein make use of relevant and appropriate materials for the theming of the environment and the light from the thematic overlay is typically "diffuse reflection" in that the light is being reflected from an uneven or granular surface such that an incident ray of light is seemingly reflected at a number of angles (e.g., is not specular reflection from a mirrored surface). Also, the display systems adjust the balances of the light on the front and rear surface of the thematic overlay to dictate or selectively define what and when a viewer is able to see a displayed content or only the diffuse display element content from the front surface (e.g., by adjusting the output light levels of the emissive display device and/or by adjusting/controlling a viewer-side light source to be balanced in a way that makes all light appear to be reflected and not projected to the viewer's eyes).

In some exemplary display systems, a high resolution, ultra bright LCD monitor (e.g., 1500 nit or the like) is placed behind a printed chiffon, a real wood thin veneer, a custom printed graphics film, or other thematic overlay. The monitor's displayed content or media may display only video black while the display system is in a dormant or inactive state (e.g., no light is emitted onto the back of the thematic overlay). The front or viewer-side lighting on the front surface of the thematic overlay may be adjusted to a level of brightness desired for allowing the material to reflect its images, textures, colors, patterns, and the like to a viewer (e.g., a minimal level of illumination or brightness may be used to allow a human eye to view this diffuse reflection content but not see/detect the monitor positioned behind this element). In this way, the thematic overlay appears to be solid or relatively thick and opaque, e.g., a plank of wood, a painting with physical brush strokes, or even a paper parchment.

In a next operating state, though, the media or displayed content on the monitor is changed so that it becomes more brightly lit or illuminated at a high enough level to be transmitted through the thematic overlay (e.g., transmitted out at a brightness similar to that of the reflected light). That emissive display content overwhelms the front lighting level in the area overlying or adjacent the monitor and dominates the viewer's attention. For example, a viewer may now see the displayed content concurrently with adjacent portions of the front surface of the thematic overlay via reflected light. The content may be a menu, an advertising message, show or other location-specific information, an animated character, or nearly any other desired visual effect that can be caused to magically appear and blend into or dominate what the viewer previously and often will continue to believe is a solid, opaque surface.

Figure 1:
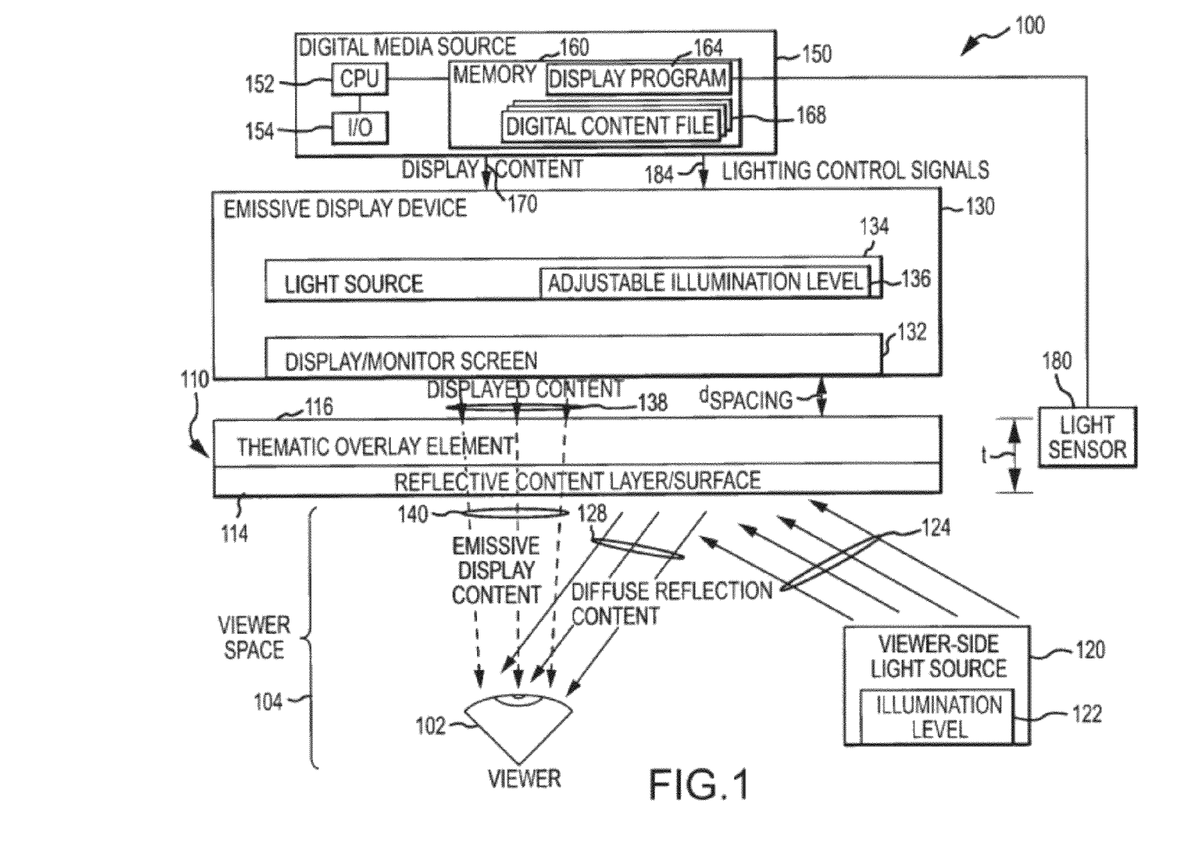
FIG. 1 illustrates in functional block form a display system that includes an emissive display device and a thematic overlay that enable the system to blend content that is provided to a viewer via diffuse reflection and transmission and also light from the monitor or display screen of the emissive display device.

FIG. 1 illustrates a functional block diagram of a display system 100 of one embodiment of the invention. As shown, the system 100 is adapted for providing a unique blended display of content provided by the thematic overlay 128 and emissive display content 140 for a viewer 102 located in a viewer space 104 such as a restaurant of an amusement park, a hallway of an upscale shopping mall, and other places where use of a television-type, square or rectangular monitor is undesirable.

To this end, the system 100 includes a thematic overlay or physical screen device (or camouflaging display element or light balancing/negotiating device) 110 that is positioned proximate to or within the viewer space 104 so as to be the portion nearest to the viewer 102. Specifically, the thematic overlay 110 includes a content provided by the diffusing display element layer/surface or front surface 114 that faces outward into the viewer space 104. The display system 100 further includes a viewer-side light source 120 that provides ambient or viewer-side light 124 that strikes the diffusing display element surface 114 causing it to be visible to the viewer 102 as shown by the diffuse reflection content 128. The light source 120 may take many forms to practice the system 100 such as the Sun or other ambient light sources to lighting systems that can have their illumination levels 122 controlled or set by a designer of the system 100 to balance the brightness of light 124 with brightness of displayed content 138 so that these contents 128, 140 both appear to be diffuse reflections from surface 114.

The display system 100 further includes an emissive display device positioned behind the display element 110 so as to face a rear surface 116 of the display element (e.g., to project or provide displayed content 138 onto the surface 116 when a light source 134 is operated). An important aspect of the display system 100 is that the thematic overlay 110 is selected or designed to hide or at least disguise the presence of the display device 130 throughout operation of the display system 100. Specifically, the emissive display device 130 (or at least its outer frame members so as to hide its rectangular and television monitor-type shape) preferably is not visible to the viewer 102 when the display device 130 is operated in an off or inactive mode (low or no light levels 136 from source 134) and the viewer-side light source 120 is providing ambient or viewer-side light 124. Further, the display device 130 is not readily visible when the light source 134 is operated in an active or on mode to provide displayed content 138 to the rear surface 116 (and then transmitted through the display element 110 as emissive display content 140 visible by viewer concurrently with diffuse reflection content 128).

To provide this disguising or hiding feature, the thematic overlay 110 is configured to be at least partially translucent or transmissive to pass the displayed content 138 while also being reflective of the light 124. To this end, the element 110 may have a thickness, t, that is chosen to allow light to be transmitted through it from display device 130 (with the thickness, t, depending on the material(s) chosen for display element 110 such as a fabric or a wood veneer or a printed screen/film or the like). The thematic overlay surface 114 may be formed of a printed chiffon with coloring and materials chosen to block the viewer 102 from viewing the display device under highest anticipated illumination levels 122 of light source 120. In other embodiments, the display element 110 may be a sheet of paper or poster board that is transmissive of displayed content 138 but reflects a substantial percentage of light 124 to provide the diffuse reflection content 128. In still other cases, the display element 110 may be formed from a thin panel of wood veneer or similar material that is transmissive of light striking surface 116 (such as the displayed content 138) but reflects much of light 124 as diffuse reflection content 128.

In each of these examples, the diffuse reflection content 128 may be thought of as overwhelming the light 124 that passes through the display element 110, strikes and is reflected from the monitor screen 132, and is transmitted through the thematic overlay 110 such that the viewer 102 perceives the surface 114 as solid and/or opaque and perceives its content 128 when the display device is in the inactive operating mode. The thematic overlay surface 114 typically is not a mirrored surface such that the reflection 128 is diffuse reflection not specular reflection, and, to this end, the surface 114 may be porous such as is the case with many papers, fabrics, wood veneers, and other similar materials that may be used for display element. The content 128 viewed by the viewer 102 may simply be the color, texture, and patterns on the surface 114 (such as brown striations of a wood panel) and/or may include graphics or text such as that useful in providing a themed environment for viewer space 104, useful for providing advertising content, and/or useful for providing information (e.g., a menu board, a show time/information board, and so on).

The display system 100 further includes an emissive display device 130 that includes a display or monitor screen 132 facing the rear surface 116 of the thematic overlay 110. The screen 132 may be spaced apart some distance, $d_{Spacing}$, from the surface 116 such as 1 to 6 inches or more to further disguise the presence of the display device 130 from the viewer 102 while, in some embodiments of system 100, the screen 132 abuts the rear surface 116 (such as when the display element 110 is formed of wood veneer or other relatively opaque and/or structurally rigid materials). The display device 130 includes a light source 134 with an adjustable or selectable illumination level 136. It is preferable that the brightness or illumination level 136 be tunable for the light source(s) 134 so that the emissive display device 130 can have the brightness of the displayed content 138 tuned to blend with the diffuse reflection content 128 as emissive display content 140 to further avoid detection of the display device 130 (e.g., the content 140 appears to have magically appeared on the surface 114 and to he part of the diffuse reflection content 128).

The display device 130 may take many forms to practice the system 100 (and, of course, more than one monitor screen 132 may be used to provide the device 130). For example, nearly any computer or television-type monitor may be used for the screen 132 (with the size and shape not being limiting to the invention) while some systems utilize high brightness LCD and/or plasma displays for device 130 such as an LCD designed to be Sunlight readable. In some cases, the light source 134 may be capable of providing ultra high levels 136 of brightness such as up to 1500 nit or the like.

The display system 100 further includes digital media source/controller 150 that may take the form of a computer or similar electronic device with a processor 152. The processor 152 manages operation of input/output devices 154 (such as keyboards, touchscreens/pads, a mouse, and the like as well as monitors, printers, and so on) to allow an operator to enter data or instructions (e.g., to manually tune the illumination levels 136, to select display content 170, to generate the content files 168, and so on) and to receive output or access portions of digital content 168 such as via a display of graphical user interfaces (GUIs) on a monitor 154. The media source 150 may include memory (computer-readable code devices causing computer 150 or processor 152 to perform particular functions such the methods of FIGS. 4 and 5).

The processor 152 may execute code/programs in memory 160 such as a display program 164 that allows an operator to generate digital content files 168 as well as selectively operate the display device 130 to output displayed content 138 by providing display content 170 (from files 168) to display device 130. The display device 130 provides the media in content 170 on display or monitor screen 132 and it is displayed at a brightness in displayed content 138 depending on the setting of the illumination level 136 of light source 134, which may be set by the display program 164.

In some cases, the illumination level 136 is chosen such that the brightness or illumination level of the emissive display content 140 is at or below the brightness or illumination level of the diffuse reflection content 128. To this end, an operator may provide settings in display program 164 for illumination level 136 of light source 134 such as by manually experimenting and tuning the level 136 based on one or more illumination levels 122 of the viewer-side light source 120 and a particular makeup of the display element 110 and content provided by the thematic overlay surface 114. In other cases, the display system 100 may include a light sensor 180 positioned to determine an illumination level 122 of the light source 120 (or brightness alight 124 striking the surface 114 in viewer space). The display program 164 may process brightness data from sensor 180 to determine an appropriate setting (see light control signals 184 sent to display device 130) for the illumination level 136 of the light source 134. This setting may be chosen to cause the displayed content 138 to be transmitted through the thematic overlay 110 as emissive display content 140 that desirably blends with diffuse reflection content 128 (e.g., select a level 134 that provides a brightness in display content 140 that matches (or that is a small amount more than so as to at least overcome/overwhelm the content 128 from the portion of the surface 114 that the content 140 is being emitted)) or is less bright than that of the reflection content 128.

Figure 2A:
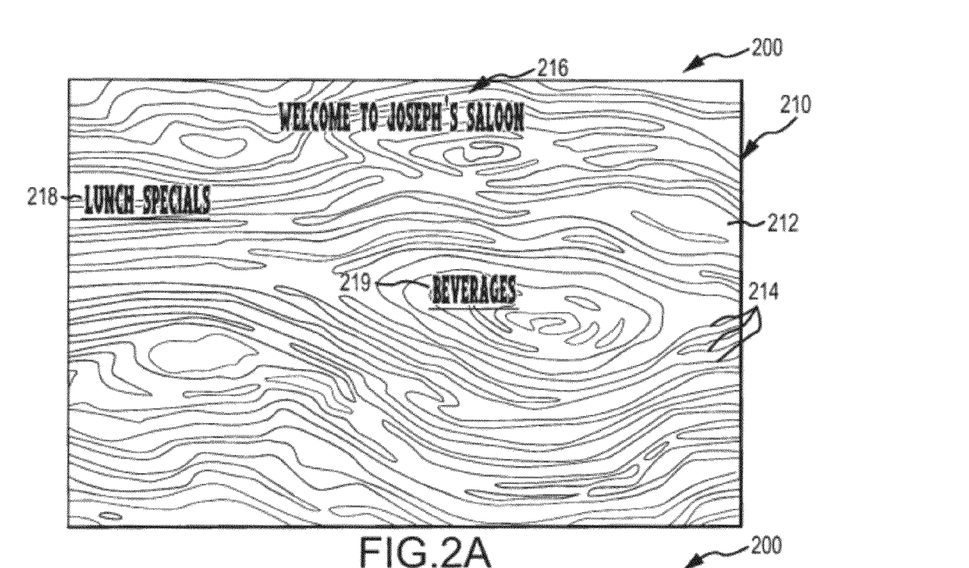
FIGS. 2A and 2B illustrate an exemplary display system with its emissive display device in two operating states, i.e., an off or non-display mode and a display mode.
Figure 2B:
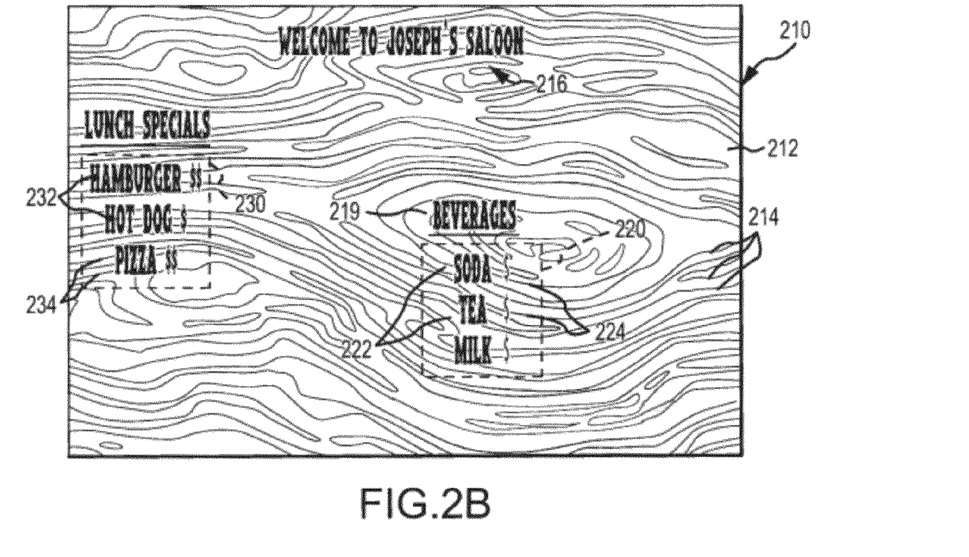

At this point, it may be useful to show a couple of examples of particular implementations and operations of display systems such as may be provided by system 100 and its components. FIGS. 2A and 2B illustrate a display system 200 that is operating in an inactive mode or first operating state as shown in. FIG. 2A and then in an active mode or second operating state as shown in FIG. 2B. The system 200 includes a thematic overlay 210 in the form of a thin sheet or panel of wood veneer, with FIGS. 2A and 2B showing the front surface 212 of the display element 210 as it would be seen by a viewer in a viewer space.

The viewer can see the surface 212 with its color (brown and black) and its graphical elements 214 (e.g., natural patterns/striations in the wood itself). The viewer can also see text elements or content 216, 218, 219 indicating, in this case, that the display element 210 is being used to display information pertaining to a restaurant and its offerings. The text elements 216, 218, 219 may be printed on the surface 212 in a font or style that suits the theme of the viewer space containing the display element 210. The graphical or surface content 214 and textual content 216, 218, 219 is visible by the viewer as diffuse reflection due to reflection of light from a viewer-side light source (or ambient light in some cases) (not shown) from front surface 212, which also causes the viewer to perceive the element 210 as a solid and opaque piece of his environment or viewer space.

The system 200 further includes an emissive display device that is not shown in FIGS. 2A and 2B because it is hidden from view by the thematic overlay 210. As shown, the viewer cannot see that an LCD or similar device is positioned directly behind the element 210. Instead, when the emissive display element is operated as shown in FIG. 2A in an off or inactive state (with it showing only black video or with its light source off or at very low brightness levels), the viewer can only perceive graphical/surface and printed textual content 214, 216, 218, 219 on the front surface 212 of the thematic overlay 210.

In FIG. 2B, the emissive display element (such as element 130 shown in FIG. 1) is operated in an on or active mode with its light source at a higher level to produce the displayed emissive display content (e.g., to overcome the diffuse reflection of light from portions 220, 230). Dashed lines 220, 230 would not be visible to a viewer but, instead, these are shown to illustrate areas where the emissive display monitor or screen is displaying content from a digital content file. In these areas 220, 230, the display screen is illuminated to show graphic/surface content 224 and 234 as well as textual content 222, 232. Interestingly, the graphic/surface content 224, 234 is configured to align and match with the surface/graphic features 214 of the front surface 212 of the thematic overlay 210 (e.g., the background imagery/media 224, 234 is the same in color/texture and other aspects as the surface 212 and is aligned with existing features 214 of surface 212). In this manner, the viewer finds it difficult to perceive that the images in areas 220, 230 are being provided by a display behind the thematic overlay 210. The textual content elements 222, 232 may be aligned also with textual elements 218, 219 and may be chosen to match their style, color, size, font, and so on such that these magically appearing elements 222, 232 appear to be printed upon the surface 212 similarly to the elements 218, 219. For example, the video playing on an LCD may be the same file (e.g., "x".jpg file) that is printed on the physical material that is placed in front of the LCD.

The example of FIGS. 2A and 2B may be useful if one wanted to produce a digital menu that looks like it belongs within a particular theme environment, e.g., a western frontier or other setting in which veneer or paneling matches the viewer space or surroundings and would not appear to simply be a monitor/display screen. Instead of veneer, a high-resolution image of a wooden fence, brick wall., or the like could have been provided on a graphics film that could be used as thematic overlay 210 in place of the veneer panel/sheet. In other cases, fabric or paper material printed as wallpaper is adhered to a wall that has a cutout behind a portion for the monitor or display screen of the emissive display device. Another version may include a transparency print on acetate with an opaque printed outer zone gradated to the clear transmission zones.

In the illustrated example, it is recognized that wood veneers can be made so thin that they have translucent qualities while still hiding the presence of the emissive display device (as apparent from FIGS. 2A and 2B where the emissive display device cannot be seen but is used to provide emissive display content in spaces 220, 230). The media or digital content files providing the emissive display content for the monitor may include customized fonts and artwork that is displayed on the monitor and visible to a viewer through the thematic overlay.

The design of the emissive display content preferably blends with the look and feel (graphical and textual elements provided on the front surface) of the thematic overlay and is provided at a tunable or selectable brightness from the monitor or display screen by operation of a backlighting source. In some embodiments, the display system includes components or members that allow the front or ambient lighting levels to be defined to selectively light the front surface of the thematic overlay. In this example, the menu content may be changed at any time from a connecting computer workstation and its software (such as source/controller 150 in FIG. 1) or hardware/software provided in the emissive display device without harming or ruining the theming of the viewer space. For example, the emissive display device may be a 16:9 video screen (e.g., an LCD or the like), and viewer or guest in the viewer space would not notice or detect the video screen or be able to determine how the information was changed or updated on the menu board.

Figure 3A:
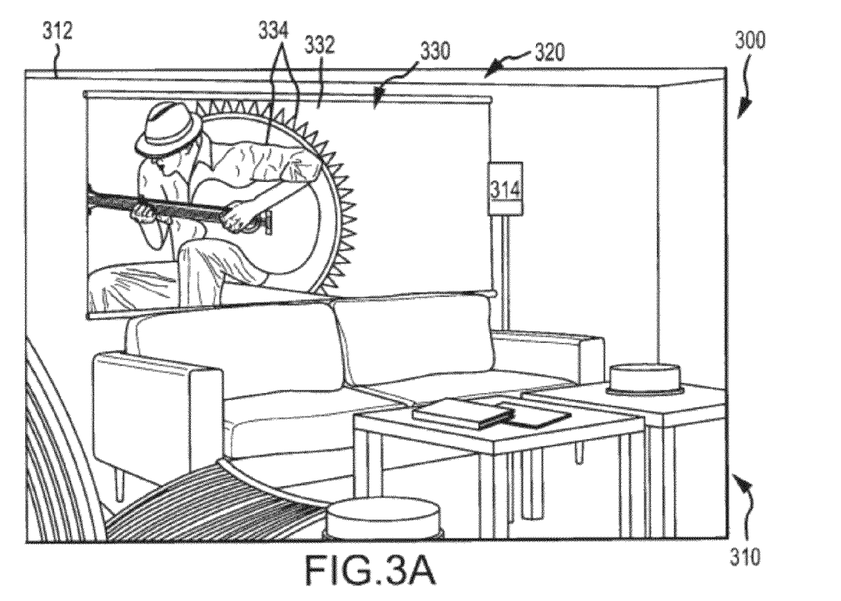
FIGS. 3A and 3B illustrate another exemplary display system similar to that of FIGS. 2A and 213 operating in two operating states to show the thematic overlay hiding a display or monitor and to show the display or monitor then operating to emit a displayed content through the thematic overlay with the display/monitor remaining hidden from view.
Figure 3B:
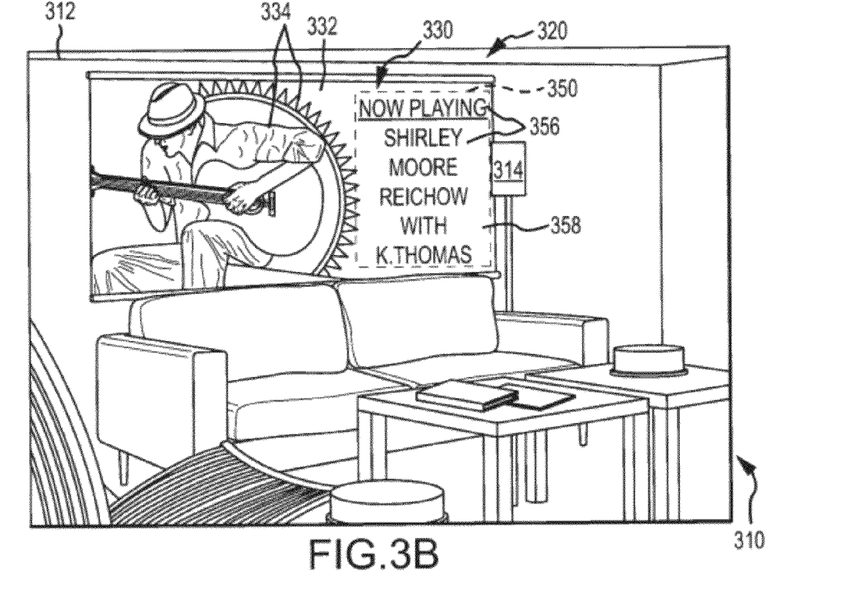

FIGS. 3A and 3B illustrate another display system 300 that may be used to present information that may be updated within artwork or a graphical poster in a room or viewer space 310. The viewer space or themed environment 310 includes a wall 312 and a viewer-side light source 314 that may be set at one or more illumination levels to provide ambient light in the room/space 310. The display system 300 further includes an emissive display device 320 behind (and hidden from view by) a diffusing display device 330 hung on wall 312. The emissive display device 320 is operating in a first or inactive state in FIG. 3A (i.e., at no or low illumination levels). In FIG. 3A, it can be seen that the emissive display device 320 is not readily visible with light from source 314 but this light causes diffuse reflection content from front surface 332 of the thematic overlay 330 to reach the viewer's eye including textual and/or graphical elements/components 334.

In FIG. 3B, the emissive display device 320 is operated at a higher illumination level such that emissive display content is provided in space or area 350 through the front surface 332 of diffusing display device 330. The emissive display content is visible concurrently with the graphical images 334 (which are visible via diffuse reflection of light from source 314). To provide proper blending (e.g., such that no projection is detected), the content in area 350 may include graphical or background components 358 that match graphical elements 334 on surface 332 in color, style, texture, pattern, size, and location (e.g., proper alignment). Further, the content in area 350 may include text-based information 356 in a style that suits the theme of room/viewer space 310. In the example, the emissive display content 356 provides information regarding an upcoming musical show or event, and it will be understood why it is desirable to be able to readily change the content 356 on an ongoing (daily, weekly, monthly, or the like) basis, and this updating can be done by updating the digital content files used as a source of display content for the emissive display device (e.g., change the text 356 to show a new band is playing but retain the aligned and theme-matched background/graphical components 358).

Again, the brightness or illumination levels of the emissive display device 320 is tuned or chosen to suit the thickness and materials of the thematic overlay 330 and also the brightness of light 314 in viewer space 310 so as to cause the content 356, 358 to be visible over diffuse reflection in the display space or area 350 while not being so high that the monitor or screen of the emissive display device 320 is readily perceived by a viewer in space 310.

Figure 4:
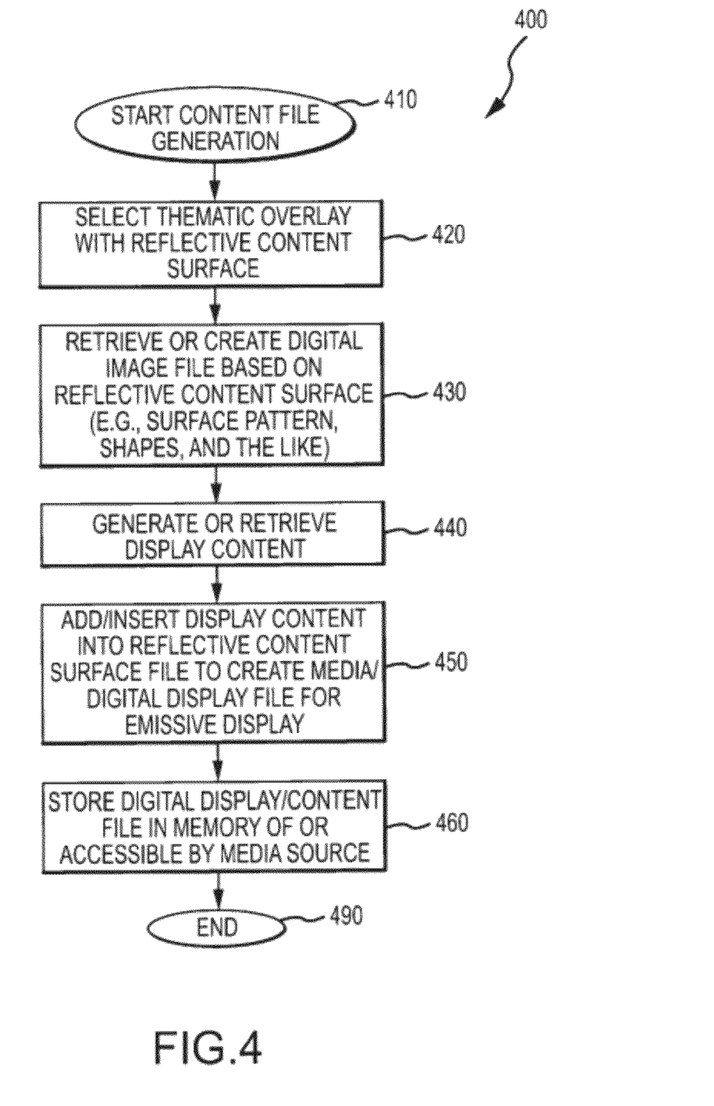

FIG. 4 illustrates a method 400 for generating a digital content file such as one of the files 168, that is used to provide content to an emissive display device for displaying through a thematic overlay (with diffuse reflection content). The method 400 starts at 410 such as with planning of the type of effect or display that is desired as well as the theming and environment in which the display system will be used. The method 400 continues at 420 with selecting a thematic overlay with a particular content provided by the thematic overlay surface. As discussed above, this display element may be a sheet of fabric and the content surface may have a printed pattern with graphic and/or textual components while other embodiments may utilize wood veneer with or without printed text/images or a plastic/paper sheet with printed graphics/text, and have the ability to digitally augment it.

At 430, a digital image file is created for the content provided by the diffuse display element surface such as by creating a digital image of the front surface that is stored in memory of a computer system (such as digital media source 150 in FIG. 1). In some cases, a digital image will be used in step 420 to create the content provided by the diffuse display element surface, and this digital image file may be retrieved at 430 for use in creating an emissive content file. The file created in step 430 will define the surface pattern, shapes, text, colors, and other information associated with the images/text visible via diffuse reflection from the front surface of the thematic overlay. At 440, the method 400 includes generating or retrieving display content. In other words, the content that a designer wishes to display is retrieved from memory or is created in step 440 and may include textual information for a menu, for an advertisement, or the like arid/or may include graphical elements or video. The range of content that may be displayed is nearly limitless, but it may be selected and designed at 440 to suit the theme of the viewer space/environment in which the display system is intended for use (such as a western motif, a medieval castle, a luxury shopping mall, a tropical island village, and so on)

At 450, the method 400 includes adding or inserting the display content into the content provided by the diffuse display element surface file from step 430 to create a media or digital display file for an emissive display device. At 460, this file is then stored in memory that is accessible by the media source or controller (e.g., device 150 of FIG. 1) or directly by the emissive display device. The method 400 may then end at 490 or more digital content files may be generated for the same or other emissive display devices. At 450, the display content from step 440 may need to be manipulated so as to properly align with existing components of the content provided by the diffuse display element surface arid/or to better suit its size, style, theme, or other aspects. For example, step 450 may involve retaining the background graphical images from the reflective surface and overlaying textual content from step 440 and then aligning the background images and textual content with adjacent portions of the content provided by the diffuse display element surface (e.g., the displayed content typically will only be a portion of the reflective surface content and preferably is matched and aligned with surrounding/adjacent portions of the reflective surface that are viewed concurrently by a viewer).

Figure 5:
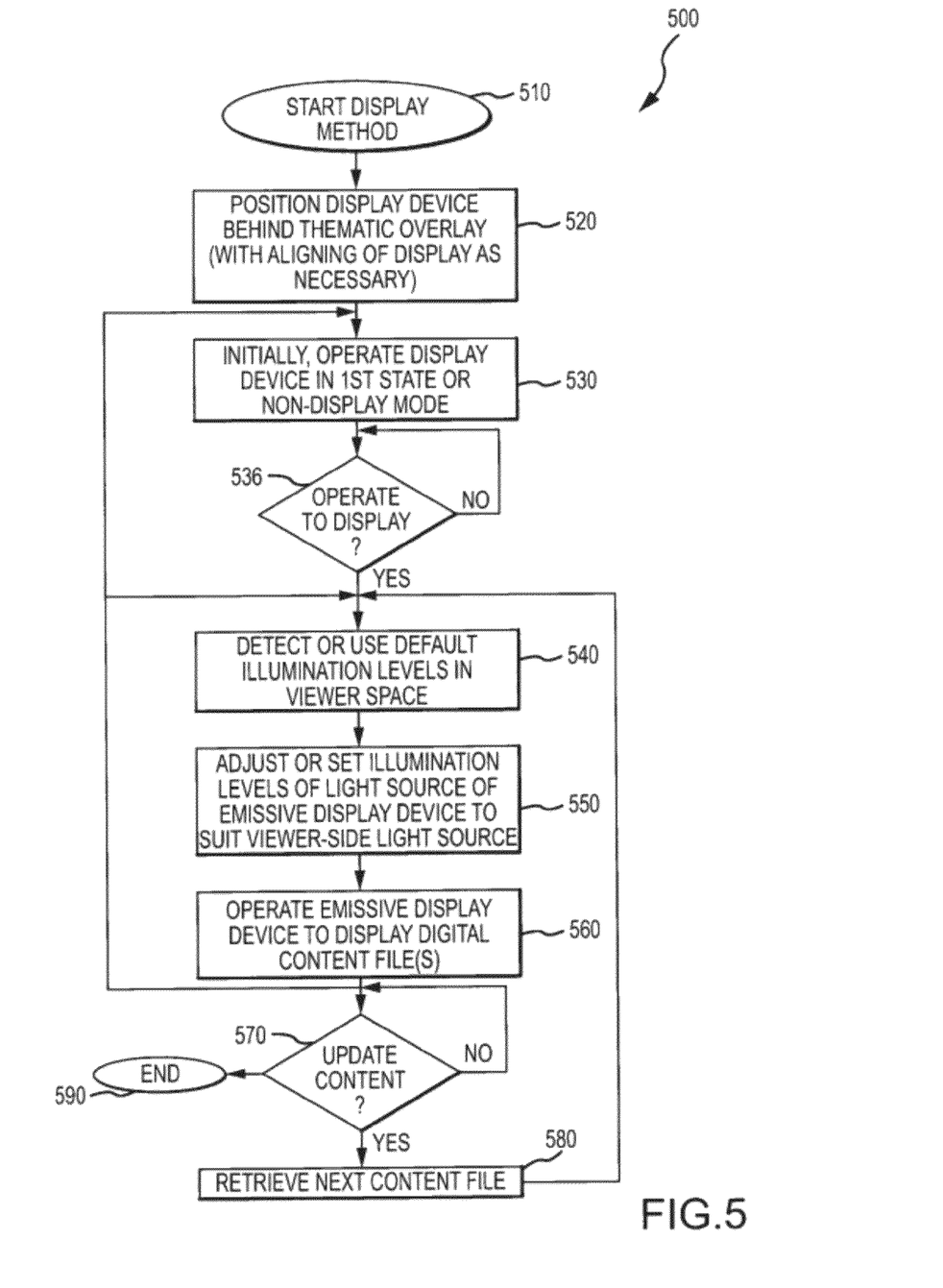
FIG. 5 illustrates a flow diagram of a method of operating a display system.

FIG. 5 illustrates a method 500 of operating a display system (such as system 100 of FIG. 1) so as to properly blend the content provided by the thematic overlay with the emissive content to hide the presence of the display screen or monitor of the emissive display device. The method 500 starts at 510 such as by selecting an emissive display device and a thematic overlay, e.g., choosing a printed film for the thematic overlay and a Sunlight readable LCD for the emissive display device when the thematic overlay has a front surface exposed to Sunlight or very bright lights. At 520, the method 500 continues with positioning the emissive display device behind the thematic overlay which may include aligning its display screen with a desired portion of the rear surface of the thematic overlay.

At 530, the method 500 may include initially operating the emissive display device at a first operating state (or non-display or inactive mode) in which it displays black video images or its light sources are "off" or dormant so that no emissive content is displayed through the thematic overlay. At 536, the controller or media source may respond to a display program to determine whether the display should be activated, and, if no, the emissive display device is retained in the first operating or inactive state.

If yes at 536, the method 500 continues with the controller detecting at 540 illumination levels in the viewer space (e.g., at the content provided by the diffuse display element surface) or choosing from one or more default illumination levels expected in viewer space. At 550, the method 500 continues with adjusting or setting illumination (or brightness) levels of the light source of the emissive display device to suit the viewer-side light levels. In other words, the emissive display device may be manually or automatically (via the controller/media source or the like) tuned to illuminate its monitor or display screen containing the emissive display content at levels such that the emissive display content transmitted out from the reflective display surface is able to be viewed by a viewer rather than the diffuse reflection from the emissive display area on this surface. This may call for the same brightness (or percentage higher brightness such as several percent to 10 percent or more increased brightness at the rear surface of the diffusing display device to cause the content to be transmitted through this device's thickness and also be visible with or over the light being reflected to the viewer).

At 560, the method 500 continues with operating the emissive display device to display the digital content files at the selected brightness levels, and this causes the viewer of content provided by the thematic overlay surface to concurrently perceive or view content provided by the thematic overlay and emissive display content (such as contents 128, 140 of FIG. 1). The method 500 may then continue with returning the emissive display device in the first or inactive operating mode at 530 and/or detecting changes in illumination levels in the viewer space or at the content provided by the diffuse display element surface at 540. The method 500 may also include at 570 determining whether the display content is to be updated (e.g., change a menu board to show new meal choices to change from breakfast to lunch or from lunch to dinner). If not, the method 500 may loop back or may end at 590. If yes, the method 500 may continue at 580 with retrieving a next content file from memory of the media source and then continuing with step 540 (or directly to step 560 if there is not changes to the illumination level of the emissive display device).

Figure 6:
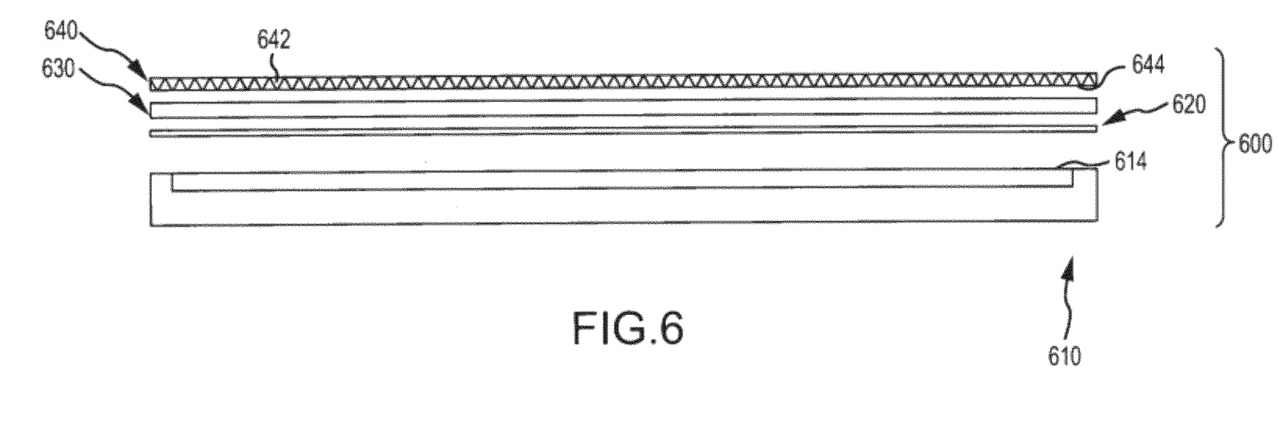
FIG. 6 illustrates a portion of a display system showing use of a combination of a fabric layer (e.g., a flexible and/or thin sheet of material) to provide content provided by the diffuse display element, a structural sheet of transparent to partially translucent material, and mask layer to provide a thematic overlay.

FIG. 6 illustrates another embodiment of a display system 600 that may be used to provide a display that blends content provided by the diffuse display element with displayed content so as to disguise the use of a monitor/display screen. The display system 600 is shown to include an emissive display device 610 such as an LCD TV or the like with a monitor or display screen 614. The system 600 further includes a masking element 620 such as a thin sheet of transparent material (plastic, glass, or the like) that includes a mask that disguises the shape and/or boundaries of the screen 614 (e.g., an opaque layer of paint on a surface of the thin sheet that may be irregular in shape to hide portions of the screen 614 to change the shape of the screen 614 should it be visible via reflected or emitted light), with both hard or a feathered gradation.

The system 600 further includes a structural support 630 upon which a flexible thematic overlay 640 is applied with a front surface 642 facing outward (e.g., toward a viewer in a viewer space) and a rear surface 644 facing inward toward the screen 614 to receive displayed content. In one embodiment, the structural support 630 is a pane or sheet of transparent material such as a polycarbonate sheet, a Lexan® sheet or the like and the element 640 is a fabric sheet or sheet of chiffon with a print providing a graphic/textual content on surface 642 that is visible to a viewer via diffuse reflection of viewer-side light.

Figure 7:
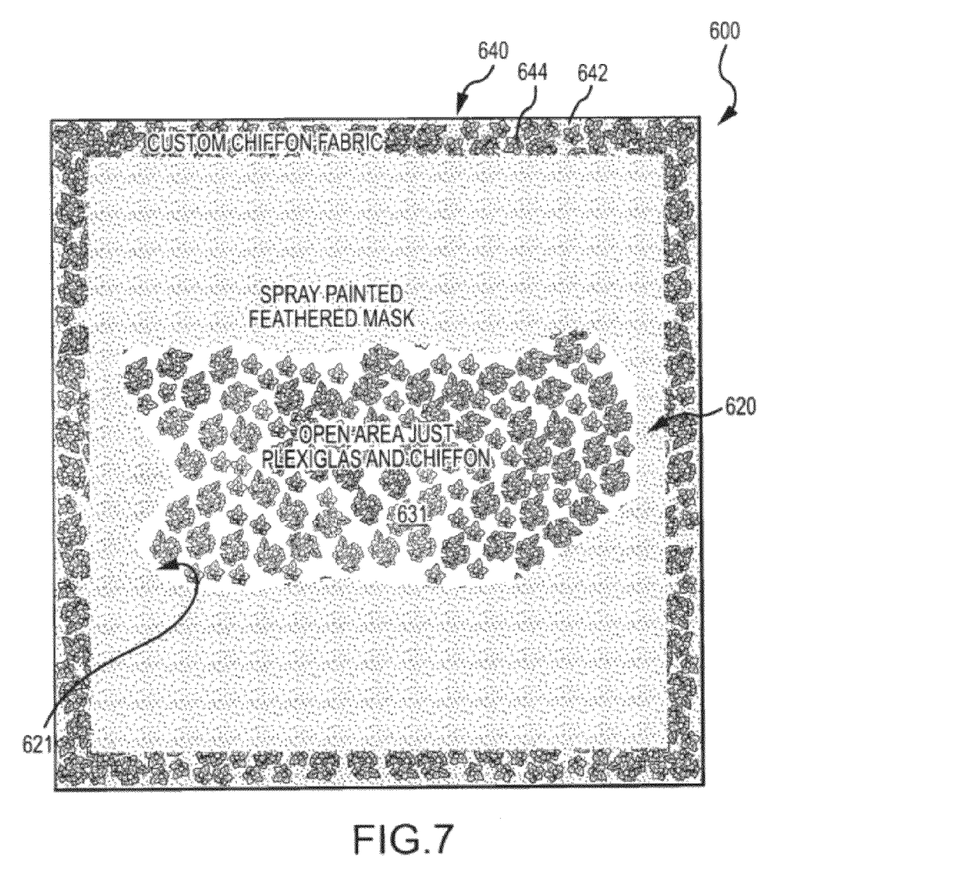
FIG. 7 illustrates a rear or back view of the display system of FIG. 6 (i.e., opposite side from a viewer's side or space) with the emissive display device removed to show one configuration of the mask layer to define an irregular opening or display window to the structural sheet and the fabric or content provided by the diffuse display element layer (and feather the edges of light from the emissive (and feather the edges of light from the emissive display so as to avoid or limit the presence of hard edges that may reveal the illusion or the devices components).

FIG. 7 shows the display system 600 from behind with the emissive display device 610 removed to expose the masking element 620. As shown, the masking element 620 includes a feathered mask 621 that is opaque (e.g., black paint or the like applied to a surface of the pane/sheet of element 620) and defines an irregular shaped (not simply a square, rectangle, a circle or the like that may be expected for a monitor) and feathered edge of a viewing port or window 631 through a structural sheet. When the emissive display device 610 is operated in a display or active mode, its screen 614 will only be able to display content and emit light through port or window 631 to the rear surface 644 of the thematic overlay 640.

Figure 8:
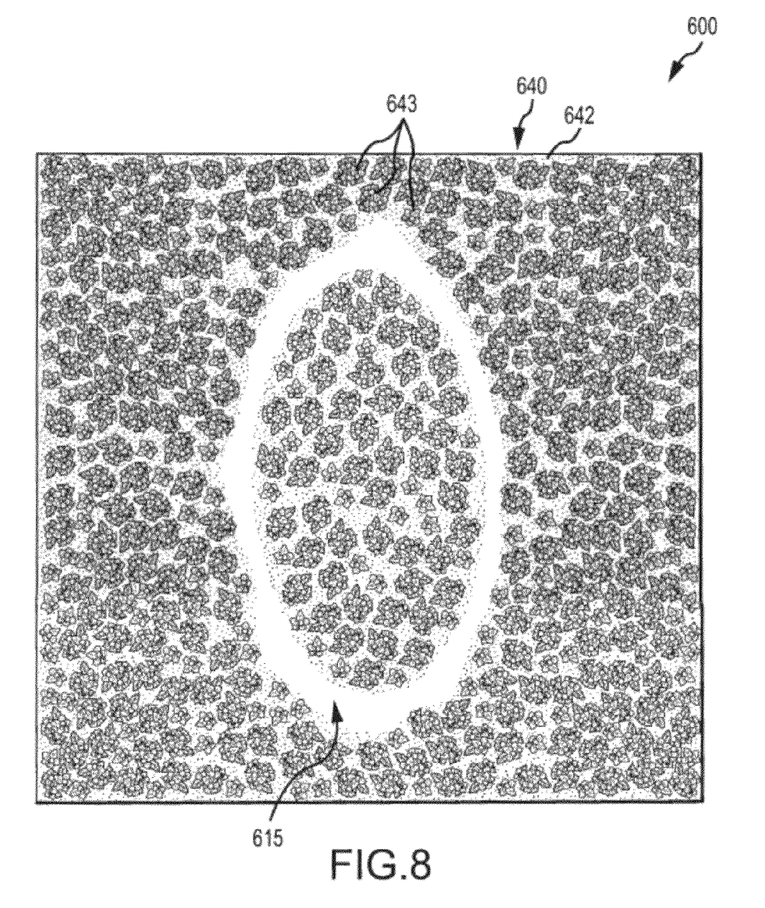
FIG. 8 shows a front view or viewer's point-of-view (POV) of the display system of FIG. 6 with the emissive display device operating to display a graphic image or emitted digital content that may be viewed concurrently with diffuse reflection and transmission content from the fabric layer (based on available ambient or other viewer-side light source(s)).

FIG. 8 shows the display system 600 from the front or a viewer's POV and with the emissive display device 610 operating in an active mode with its screen 614 illuminated by a backlight source. The backlighting is at a brightness or illumination level that causes the displayed content to be visible to a viewer as emissive display content 615 through the thematic overlay 640 (as well as through masking element 620 and a structural sheet with window 631). The displayed content 615 is only visible through the window 631, and it is visible or perceived concurrently with diffuse reflection content from front surface 642 of thematic overlay 640 such as with pattern/graphics 643 in this example. As shown in FIG. 8, the display or monitor screen 614 is not itself visible to a viewer but only the displayed content.

Figure 9:
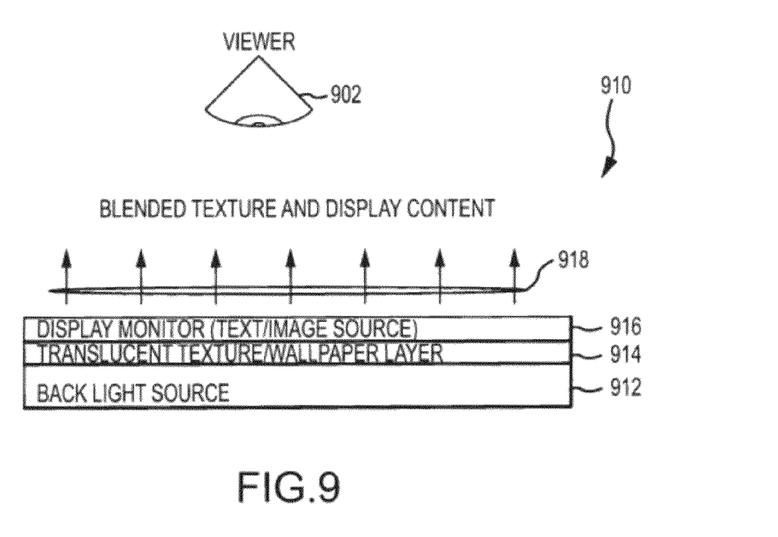
FIG. 9 illustrates another embodiment of a display system in which a content layer is further included in the emissive display device to provide a three-dimensional (3D) effect.

FIG. 9 illustrates another display system 910 that may be used to achieve a three dimensional (3D) illusion for a viewer 902. The display system 910 includes a backlight source 912 upon which a translucent layer 914, such as a sheet of paper, fabric, or the like providing a background texture or graphical image (or text). Without more, the system 910 would allow the viewer 902 to view the background content provided by the layer 914 when the backlight source 912 is operated to light the layer 914. The system 910 further includes a display monitor 916 that functions as a source of foreground content such as text or graphics. When the backlight source 912 is operated along with the monitor 916, the system 910 outputs a blended texture and display content 918 that includes content from the texture or background layer 914 as well as the display monitor or foreground content source 916.

In some embodiments, the display monitor 916 takes the form of an LCD monitor or display screen with its polarized layers and that is operated to digitally present the foreground content (e.g., from a media source as shown in FIG. 1), which may then be displayed concurrently with the content of the layer 914 by operation of the backlighting source 912 (e.g., at a brightness to transmit light through layer 914 and also through monitor 916). Due to the spacing of the layer 914 from the front surface of the monitor 916, a 3D parallax effect is achieved and perceived by viewer 902. In use, the content presented by monitor 916 may readily be changed and updated while the background layer 914 and its media/content are retained.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

It may be useful at this time to further discuss the display apparatus or system 100 of FIG. 1 to further explain how the unique displays of the present invention are achieved. The thematic overlay 110 may include a white printed layer or substrate 114 that possesses the same characteristics that provide a percent or amount of opacity as well as a percent or amount of transparency. For example, the back surface 116 may include a graphic print layer possessing a particular percentage or amount of transparency. Light 124 from a light source 120 passes through a front surface 114 and strikes this print layer or back surface 116, which reflects an image or content 128 to a viewer's eye 102. The back layer of white in this example serves to create a "backlight" to illuminate the front image 114, making it brighter and "punchy." The diffusion aspect of the back also diffuses the "pixel box." The transparency amount or percentage of thematic overlay 116 is selected so that this reflected image 128 is desirably blended with the content 138 from the display device 130 that is emitted 140 to the viewer 102 such that the viewer 102 perceives the combination of light/content (or imagery) 128, 140 as all being reflected.

We claim:

1. An apparatus for displaying content to a viewer in a viewer space, comprising:

an emissive display device with a display screen providing digital content and a light source for selectively articulating and transmitting light through the display screen such that the digital content is visible as displayed content on a surface of the display screen at an illumination level; and a thematic overlay positioned over the display screen, wherein the thematic overlay includes a rear surface facing the display screen and a front surface, opposite the rear surface, that is configured to provide diffuse reflection of light striking the front surface from the viewer space such that the front surface appears substantially opaque to the viewer, wherein the light source is first operated in an inactive mode and wherein the display screen is blocked from view by the viewer by the thematic overlay, wherein the light source is second operated in an active mode to transmit the light through the display screen, wherein, in the active mode, the displayed content is transmitted through the thematic overlay as emissive display content, wherein the light reflected by the front surface is visible by the viewer as diffuse reflection content concurrently with the emissive display content, wherein the light reflected by the front surface is not specular reflection of the light striking the front surface from the viewer space, wherein the thematic overlay is free of a specular reflection surface, and wherein a brightness of the light source, in the active mode, is adjusted to a level such that a brightness of the emissive display content is 90 to 110 percent of a brightness of the diffuse reflection content.

2. The apparatus of claim 1, wherein the light source is adjustable to set the illumination level at a level such that the emissive display content has a brightness about equal to a brightness of the diffuse reflection content.

3. The apparatus of claim 1, wherein the diffuse reflection content includes a graphical component with a pattern and wherein the emissive display content includes a graphical component aligned with and repeating the pattern.

4. The apparatus of claim 1, wherein the thematic overlay comprises at least one of a panel of wood veneer, a printed fabric, or a film with printed graphics on the front surface.

5. The apparatus of claim 1, wherein at least a portion of the light reflected by the front surface that is concurrently visible by the viewer with the emissive display content is reflected from an area of the thematic overlay adjacent to the display screen.

6. The apparatus of claim 1, further including a mask between the display screen of the emissive display device and the thematic overlay, the mask including an opaque portion blocking the light transmitted through the display screen from reaching the rear surface of the thematic overlay and further including a window portion transmitting the light transmitted through the display screen, whereby a subset of the display screen is used to provide the displayed content.

7. A method for displaying content, comprising:
positioning an emissive display device behind a thematic overlay, the thematic overlay being at least partially translucent to light and further including a front exposed surface that provides diffuse, non-specular reflection of light;
operating the emissive display device to display a digital content file on a display screen facing a rear surface of the thematic overlay, wherein the thematic overlay is free of a specular reflection surface; and
based on a brightness of the diffuse reflection of the light from the front surface, adjusting an illumination level of a light source of the emissive display device to cause the display of the digital content to be transmitted through the thematic overlay and blend with the diffuse reflection as emissive display content,
wherein the illumination level of the light source is set such that the emissive display content has a brightness that is 90 to 110 percent of the brightness of the diffuse reflection.

8. The method of claim 7, wherein the digital content file is generated in part by creating a digital image of the front surface of the thematic overlay, whereby the digital content file includes at least one graphical component from the front surface.

9. The method of claim 7, further including operating the emissive display device to halt display of the digital content file and second operating the emissive display device to display an additional digital content file on the display screen to present additional emissive display content.

10. The method of claim 7, further including adjusting a viewer-side light source providing the light striking the front surface to change the blend of the diffuse reflection and the displayed content, whereby the display screen is blocked from view by the thematic overlay.

11. A display system, comprising:
a media source providing digital content for display;
an electronic display device communicatively linked to the media source with a monitor screen displaying the digital content and with a light source for providing light to the monitor screen at a selectable brightness;
a diffuse display element layer positioned between a viewer space and the monitor screen with a rear surface facing the monitor screen and a front surface facing the viewer space, wherein the front surface provides diffuse reflection of light from a light source in the viewer space without specular reflection from the rear surface into the viewer space and wherein the brightness of the light source of the display device is great enough in magnitude to cause the digital content to pass through the content provided by the diffuse display element layer as emissive display content,
wherein the brightness of the light source of the display device is adjusted to a level such that a brightness of the emissive display content is 90 to 110 percent of the brightness of the diffuse reflection and wherein the brightness of the diffuse reflection remains unchanged when the monitor screen is performing the displaying of the digital content and when the monitor screen is in an inactive mode.

12. The system of claim 11, wherein the diffuse display element layer comprises a thickness of fabric, wood, paper, glass, or plastic and wherein the rear and front surfaces are at least partially translucent to light.

13. The system of claim 11, wherein the electronic display device comprises an LCD or plasma display with a brightness of at least about 400 nit.

14. The system of claim 11, further comprising a masking element positioned between the monitor screen and rear surface of the diffuse display element layer, the masking element including a mask that is substantially opaque to light and defining a display window smaller in size than and differing in shape than the monitor screen and comprising a feathered or hard edge.

15. The system of claim 11, wherein the viewer space light source is adjusted such that the light striking the front surface provides a brightness level for the diffuse reflection that blocks view of the monitor screen through the diffuse display element layer.

16. The system of claim 11, wherein the digital content provided by the media source comprises a graphical element matching a graphical element on the front surface and wherein the monitor screen is aligned with the rear surface to align a portion of the graphical element in the digital content with the graphical element on the front surface.

17. The system of claim 11, wherein the diffuse display element layer comprises a thickness of translucent material and wherein the front surface has a porous consistency such that it provides non-specular reflection of the light from the light source in the viewer space.

* * * * *

UNITED STATES PATENT AND TRADEMARK OFFICE
CERTIFICATE OF CORRECTION

PATENT NO. : 9,013,515 B2
APPLICATION NO. : 12/958892
DATED : April 21, 2015
INVENTOR(S) : Daniel M. Joseph et al.

It is certified that error appears in the above-identified patent and that said Letters Patent is hereby corrected as shown below:

In the Specification,

Column 2, line 18, delete "for in" and insert therefor --form--,

Column 3, line 7, delete "missive" and insert therefor --emissive--,

Column 4, line 13, delete "gaphics" and insert therefor --graphics--,

Column 8, line 26, delete "alight" and insert therefor --of light--,

Column 11, line 22, delete "arid/or" and insert therefor --and/or--,

Column 11, line 39, delete "arid/or" and insert therefor --and/or--.

Signed and Sealed this
Eighteenth Day of August, 2015

Michelle K. Lee
*Director of the United States Patent and Trademark Office*